United States Patent [19]

Okamoto et al.

[11] Patent Number: 5,115,510
[45] Date of Patent: May 19, 1992

[54] MULTISTAGE DATA FLOW PROCESSOR WITH INSTRUCTION PACKET, FETCH, STORAGE TRANSMISSION AND ADDRESS GENERATION CONTROLLED BY DESTINATION INFORMATION

[75] Inventors: Toshiya Okamoto, Kyoto; Souichi Miyata, Nara, both of Japan

[73] Assignee: Sharp Kabushiki Kaisha, Osaka, Japan

[21] Appl. No.: 259,722

[22] Filed: Oct. 19, 1988

[30] Foreign Application Priority Data

Oct. 20, 1987 [JP] Japan .............................. 62-265733
Jan. 18, 1988 [JP] Japan .................................. 63-7791

[51] Int. Cl.$^5$ ............................................. G06F 3/00
[52] U.S. Cl. .................................... 395/775; 364/281.8; 364/284.3; 364/255.1; 364/260; 364/DIG. 1
[58] Field of Search ... 364/200 MS File, 900 MS File

[56] References Cited

U.S. PATENT DOCUMENTS

| | | | |
|---|---|---|---|
| 3,962,706 | 6/1976 | Dennis | 364/900 |
| 4,128,882 | 12/1978 | Dennis | 364/200 |
| 4,130,885 | 12/1978 | Dennis | 364/900 |
| 4,149,240 | 4/1979 | Misunas | 364/200 |
| 4,153,932 | 5/1979 | Dennis | 364/200 |
| 4,197,589 | 4/1980 | Cornish | 364/900 |
| 4,591,979 | 5/1986 | Iwashita | 364/200 |
| 4,594,655 | 6/1986 | Hao | 364/200 |
| 4,594,661 | 6/1986 | Moore | 364/200 |
| 4,597,074 | 6/1986 | Demichelis | 370/58.2 |
| 4,675,806 | 6/1987 | Uchida | 364/200 |
| 4,720,780 | 1/1988 | Dolecek | 364/200 |
| 4,860,191 | 8/1989 | Nomura | 364/200 |
| 4,864,491 | 9/1989 | Ohuchi | 364/200 |
| 4,953,082 | 8/1990 | Nomura | 364/200 |

*Primary Examiner*—Thomas C. Lee
*Assistant Examiner*—Eric Coleman

[57] ABSTRACT

An information processor includes a program memory for storing a data flow program having destination information and instruction information as one set. Destination information, instruction information and operand data included in an input data packet are latched in an input data latching portion. Only the operand data is transferred to an output data latching portion. An address is operated based on the destination information latched in the input data latching portion, and the program memory is accessed, so that the data flow program is read out. The destination information and the instruction information included in the read data flow program are latched in the output data latching portion. Paired data is detected by a paired data detection portion based on the data flow program latched in the output data latching portion. The detected data is operated by an operation processing portion.

11 Claims, 7 Drawing Sheets

MULTISTAGE DATA FLOW PROCESSOR WITH INSTRUCTION PACKET, FETCH, STORAGE TRANSMISSION AND ADDRESS GENERATION CONTROLLED BY DESTINATION INFORMATION

BACKGROUND OF THE INVENTION

1. Field of the Invention

The present invention relates generally to information processors, and more particularly, to a data flow type information processor performing an operation by arrival of data and having an information processing portion and a program memory storing a data flow program provided outside thereof.

2. Description of the Related Prior Art

FIG. 1 is a schematic block diagram illustrating a conventional data flow type information processor, and FIG. 2 is a diagram illustrating a part of the content stored in a program memory.

Referring now to FIGS. 1 and 2, a description is made on a structure and a schematic operation of the conventional data flow type information processor. In FIG. 1, a program storing portion 1 includes a program memory (not shown). The program memory stores a data flow program including the content of a destination field (destination information) and instruction information in an input data packet. The program storing portion 1 reads out the destination information and the instruction information by addressing based on the destination information, and stores each of the information in the destination field and the instruction field in the input data packet, for outputting the same.

A paired data detecting portion 2 queues data packets inputted from the program storing portion 1, and stores operand data in one of two data packets having the same destination information in a data field in the other data packet, for outputting the same. An operation processing portion 3 decodes the instruction information in the data packets inputted from the paired data detecting portion 2, performs predetermined operation processing with respect to the two operand data, and stores the result of the operation processing in the data field in the input data packet, for outputting the same to the program storing portion 1.

In the data flow type information processor illustrated in FIG. 1, the data packet circulates through the program storing portion 1, the paired data detecting portion 2, and the operation processing portion 3 in that order, so that operation processing based on a program stored in the program storing portion 1 progresses.

FIG. 3 is a diagram illustrating a schematic structure of the program storing portion illustrated in FIG. 1. In FIG. 3, an input data latching portion 4 holds the present destination information, and the instruction information therein is erased. The input data latching portion 4 also latches operand data. The destination information latched in the input data latching portion 4 is applied to an address calculating portion 5, where an address in a program memory 6 is calculated based on the destination information. The program memory 6 stores a data flow program including destination information and instruction information as shown in FIG. 2. New destination information and instruction information read out from the program memory 6 are applied to an output data latching portion 7, for being latched. The output data latching portion 7 latches the operand data latched in the input data latching portion 4 without any modifications.

In the conventional data flow type information processor illustrated in FIGS. 1 to 3, reading portions of instruction information in programs are all located therein (a portion which has been formed in advance and cannot be increased/eliminated), so that a memory having sufficient capacity to contain all the programs must be provided. However, in general, it is difficult for the information processor to make the capacity of the program memory proper irrespective of whether the memory is structured by a plurality of semiconductor parts or a single LSI (large-scale integrated circuit). As a result the information processor cannot have a flexible hardware structure corresponding to a program to be executed.

The program memory 6 is externally connected to the program storing portion 1, so that the capacity of the program memory 6 is suitably increased or decreased. However, in the data flow type information processor, even if data is applied to the program storing portion 1 from the operation processing portion 3, the data must be processed one by one. Thus, if and when data are sequentially sent from the operation processing portion 3, subsequent data must wait while the first data is processed, so that the waiting time of the data becomes long, whereby the speed of processing becomes slow.

SUMMARY OF THE INVENTION

Therefore, an object of the present invention is to provide a very useful information processor which can have a flexible hardware structure corresponding to a program to be executed by providing program storing means for storing a data flow program outside of an information processing portion.

In accordance with a first aspect, the present invention is directed to a data flow type information processor having an information processing portion and program storing means for storing a data flow program having as one set destination information and instruction information. The program storing portion is provided outside the information processing portion, which is adapted to store in input storing means the destination information and the instruction information included in an input data packet, operate an address in the program storing means based on the stored destination information, read out the destination information and the instruction information from the program storing means based on the address to store the same in output storing means, and autonomously and selectively transfer the stored destination information and the instruction information.

Thus, in accordance with the first aspect of the present invention, a very useful information processor can be obtained which can have a flexible hardware structure corresponding to a program to be executed by providing the program storing means outside of the information processing portion.

In accordance with a second aspect of the present invention, the data flow type information processor is adapted to store in input storing means destination information and instruction information included in an input data packet, store in output storing means the destination information and the instruction information read out from program storing means, operate an address in the program storing means by address operating means based on the destination information stored in the output storing means, read out the destination information and the instruction information from the program storing means based on the address to apply the same to the output storing means, and autonomously and selectively transfer the destination information and the instruction information.

Thus, in accordance with the second aspect of the present invention, the program storing means is provided outside the information processing portion, so that the same effect as the effect according to the first aspect can be obtained.

In accordance with the third aspect of the present invention, the data flow type information processor calculates a write address from instruction information included in an input data packet every generation information when the input data packet is stored in input storing means to specify an address in output storing means, and stores in the output storing means destination information included in the input data packet every generation, so that an address in program storing means is calculated based on the destination information stored in the output storing means. Whereby, the destination information and the instruction information are read out from the program storing means. The address in the output storing means is operated based on the destination information and the generation information stored in the output storing means, so that the destination information and the instruction information read out from the program storing means are read out in the address.

Thus, in accordance with the third aspect of the present invention, corresponding destination information and instruction information are read out from the program storing means every time the input data packet is applied and the read-out information are sequentially stored in the output storing means. As a result, the waiting time can be decreased even if the input data packet is sequentially inputted, and the processing speed can be increased.

In accordance with a preferred embodiment based on the first, second and third aspects of the present invention, the input storing means is structured by input-side data holding means and input-side transfer control means. The input-side transfer control means holds in the input-side data holding means destination information, instruction information and operand data included in an input data packet and outputs a transmission signal to output storing means in response to the application of the transmission signal and the application of a transmission authorizing signal from output storing means. Only the held operand data is outputted to the output storing means.

Thus, in accordance with the preferred embodiment, even if the input data packet is asynchronously inputted, transfer control can be autonomously and selectively performed.

Additionally, in a further preferred embodiment of the present invention, output-side storing means is structured by output-side data holding means and output-side transfer control means. The output-side transfer control means holds in the output-side data holding means destination information and instruction information read out from program storing means and operand data outputted from the input-side data holding means in response to the application of a transmission signal from input-side transfer control means and the application of a transmission authorizing signal from the succeeding stage.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 4:
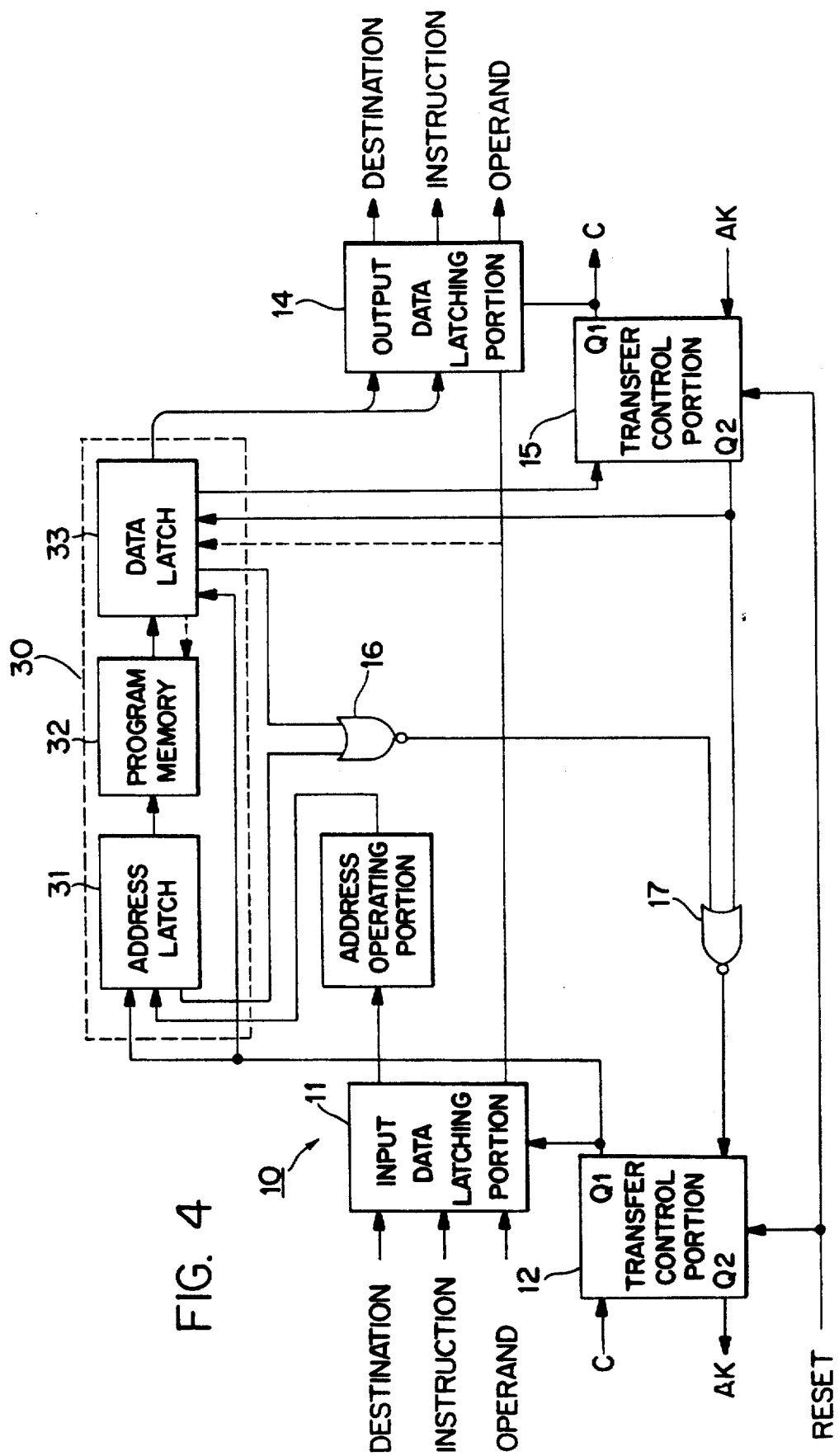
FIG. 4 is a schematic block diagram illustrating a data flow type information processor according to one embodiment of the present invention.
Figure 5:
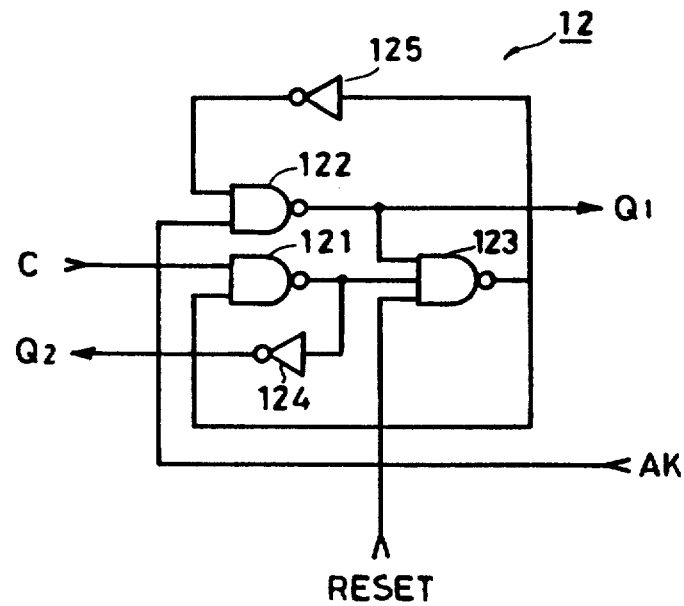
FIG. 5 is a schematic block diagram illustrating a transfer control portion shown in FIG. 3.

FIG. 4 is a schematic block diagram illustrating a data flow type information processor according to one embodiment of the present invention, and FIG. 5 is a more detailed schematic block diagram of a transfer control portion illustrated in FIG. 4.

Referring now to FIGS. 4 and 5, a description is made for a structure of the information processor according to one embodiment of the present invention. A program storing portion illustrated in FIG. 4 is divided into two portions, i.e., a program providing portion 10 and a program memory portion 30. The program providing portion 10 is provided in an information processing portion (not shown), and the program storing portion 30 is provided outside the information processing portion.

The program providing portion 10 includes an input data latching portion 11, a transfer control portion 12, an address operating portion 13, an output data latching portion 14, a transfer control portion 15, and NOR gates 16 and 17. The program storing portion 30 includes an address latch 31, a program memory 32 and a data latch 33.

The input data latching portion 11 includes an area for storing destination information, instruction information and operand data. The input data latching portion 11 latches the destination information, the instruction information and the operand data when a pulse signal is applied from a $Q_1$ output of the transfer control portion 12, for applying the destination information to the address operating portion 13 while applying the operand data to the output data latching portion 14. The instruction information is not outputted.

The transfer control portion 12 includes NAND gates 121, 122 and 123 and inverters 124 and 125, as illustrated in FIG. 5. A transmission signal C is inputted to one input terminal of the NAND gate 121 from a transmission path (not shown) in the preceding stage, and a transmission authorizing signal AK is applied as a $Q_2$ output to a transmission path in the preceding stage from the inverter 124. An output of the NAND gate 122 is outputted as a $Q_1$ output. In addition, the transmission authorizing signal AK is applied to one input terminal of the NAND gate 122 from the NOR gate 17 illustrated in FIG. 4. Furthermore, a reset signal is inputted to the NAND gate 123. When the transmission signal C is applied from the transmission path in the preceding stage and the transmission authorizing signal AK is applied through the NOR gate 17, the transfer control portion 12 derives pulse signals from the $Q_1$ output and the $Q_2$ output, for applying the pulse signal derived from the $Q_1$ output to the input data latching portion 11 and the address latch 31 and the data latch 33 in the program storing portion 30, as well as for applying the $Q_2$ output to the operation processing portion 3 as a transmission authorizing signal.

Figure 2:
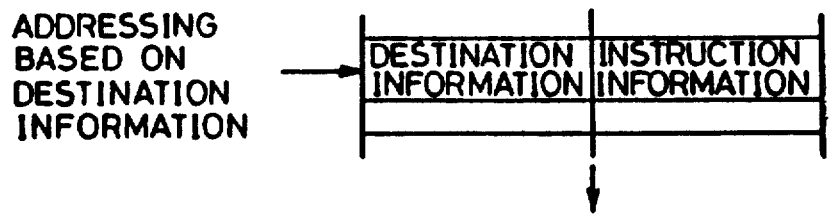
FIG. 2 is a diagram illustrating a part of the content stored in a program memory.
Figure 3:
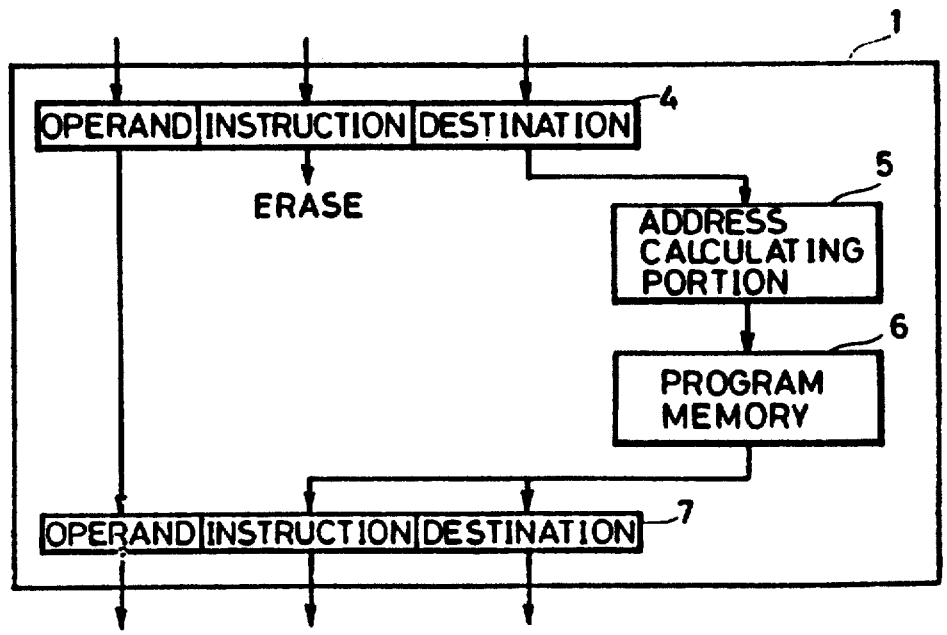
FIG. 3 is a block diagram illustrating a program storing portion in an information processor.

The address operating portion 13 operates address data in the program memory 32 based on the destination information, and an address output thereof is applied to the address latch 31. When the pulse signal is applied from the transfer control portion 12, the address latch 31 latches the address data operated in the address operation portion 13 and applies the transmission authorizing signal AK to the transfer control portion 12 through the NOR gates 16 and 17. The address data latched in the address latch 31 is applied to the program memory 32, for addressing. By addressing, the program memory 32 reads out the data flow program including the above described destination information and instruction information as illustrated in FIG. 2, for applying the same to the data latch 33.

The data latch 33 latches the data flow program read out from the program memory 32 when the transmission authorizing signal AK and the pulse signal are respectively applied from the transfer control portion 15 and the $Q_1$ output of the transfer control portion 12, the data latch 33 latches the data flow program read out from the program memory 32. The data latch 33 applies the transmission authorizing signal AK to the transfer control portion 12 through the NOR gates 16 and 17, and applies the transmission signal C to the transfer control portion 15. The transfer control portion 15 is structured in the same manner as the transfer control portion 12 illustrated in FIG. 5. When the transmission signal is inputted and the transmission authorizing signal AK is applied from a transmission path (not shown) in the succeeding stage, the transfer control portion 15 outputs the pulse signal from the $Q_1$ output, for applying the same to the output data latching portion 14 and for applying the transmission signal C to the transmission path in the succeeding stage. The output data latching portion 14 is responsive to the pulse signal outputted from the transfer control portion 15 for latching the destination information and the instruction information read out from the program memory 32 and the operand data outputted from the input data latching portion 11, for outputting the same to the exterior.

Figure 6:
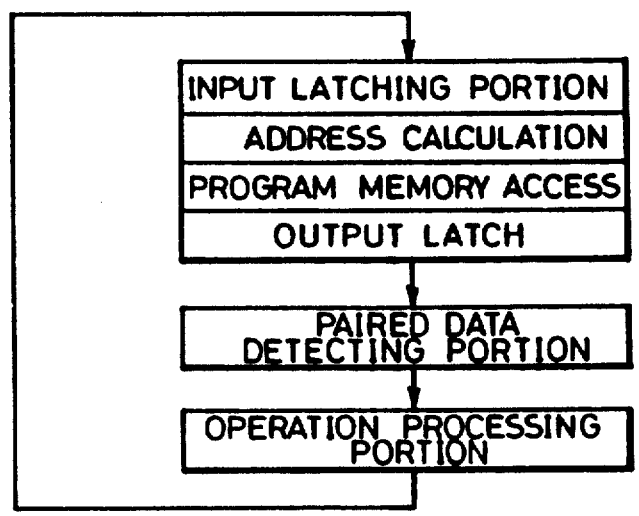
FIG. 6 is a diagram for explaining an access method according to one embodiment of the present invention.

FIG. 6 is a diagram for explaining an access method according to the embodiment illustrated in FIG. 4.

Figure 1:
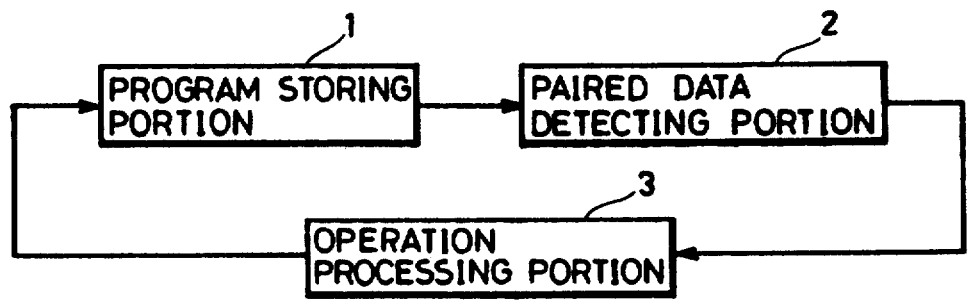
FIG. 1 is a schematic block diagram illustrating a conventional data flow type information processor.

Referring now to FIGS. 4 to 6, description is made on a specific operation according to one embodiment of the present invention. The input data packet comprising the destination information, the instruction information and the operand data and the transmission signal C are applied to the input data latching portion 11 from the operation processing portion 3 illustrated in FIG. 1. On this occasion, when the transmission authorizing signal is applied to the transfer control portion 12 through the NOR gate 17, the transfer control portion 12 outputs the pulse signal from the $Q_1$ output, for applying the same to the input data latching portion 11. Correspondingly, the input data latching portion 11 latches the destination information, the instruction information and the operand data. The destination information latched in the input data latching portion 11 is applied to the address operating portion 13, while the operand data latched therein is applied to the output data latching portion 14.

The address operating portion 13 operates address data in the program memory 32 based on the destination information, for applying the address data to the address latch 31. The pulse signal is applied to the address latch 31 from the $Q_1$ output of the transfer control portion 12. However, since the program storing portion 30 is externally provided, the pulse signal is applied to the address latch 31 after a lapse of a predetermined time period from the time when the pulse signal is applied to the input data latching portion 11. The address latch 31 is responsive to the pulse signal for latching the address data applied from the address operating portion 13. The address data latched in the address latch 31 is applied to the program memory 32, so that the program memory 32 is accessed. A data flow program including the destination information and the instruction information is read out from an addressed area in the program memory 32, to be applied to the data latch 33.

When the transmission authorizing signal AK is applied from the transfer control portion 15, and the pulse signal is applied from the $Q_1$ output of the transfer control portion 12, the data latch 33 latches the data flow program read out from the program memory 32. At the same time, the data latch 33 applies the transmission signal C to the transfer control portion 15. The data flow program latched in the data latch 33 is applied to the output data latching portion 14. When the transmission authorizing signal AK is applied from the paired data detecting portion 2 illustrated in FIG. 1 and the transmission signal C is applied from the data latch 33, the transfer control portion 15 latches the destination information and the instruction information included in the data flow program applied from the data latch 33, and latches the operand data applied from the input data latching portion 11. The destination information, the instruction information and the operand data latched in the output data latching portion 14 are applied to the paired data detecting portion 2, and are subjected to predetermined processing.

Meanwhile, when the data flow program is written to the program memory 32, the data flow program is latched in the data latch 33 from the input data latching portion 11 through a path represented by a dotted line, and the program memory 32 is addressed by the address operating portion 13, so that the latched data flow program is written therein.

Figure 7:
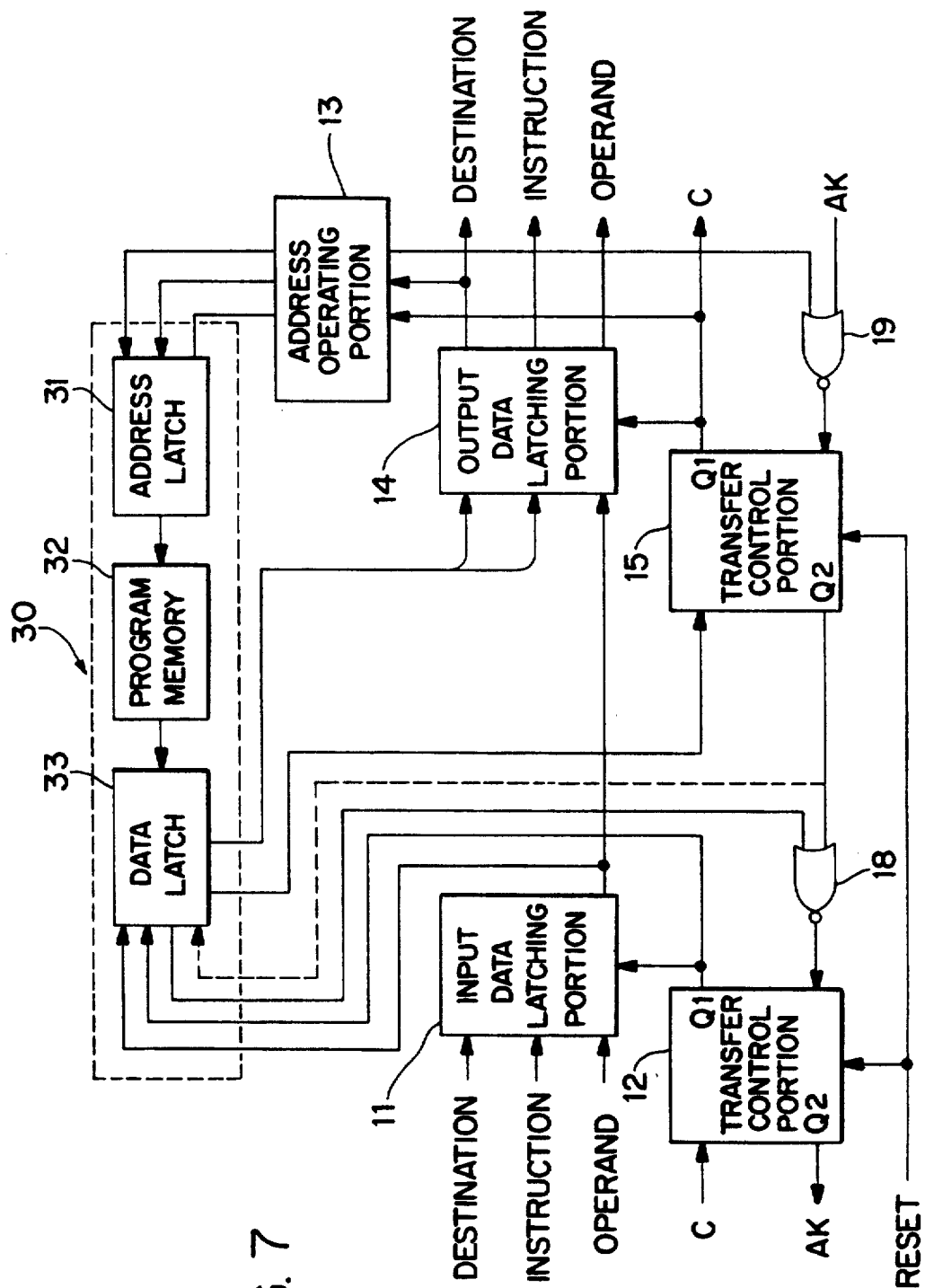
FIG. 7 is a block diagram illustrating a data flow type information processor according to another embodiment of the present invention.

FIG. 7 is a block diagram illustrating another embodiment of the present invention. The embodiment illustrated in FIG. 7 is similar to the embodiment illustrated in FIG. 4 except for the following. More specifically, an address operating portion 13 operates an address in a program memory 32 based on destination information latched in an output data latching portion 14. A pulse signal is applied to the address operating portion 13 from a $Q_1$ output of the transfer control portion 15, and a transmission authorizing signal AK is applied to the transfer control portion 15 from the address operating portion 13 through a NOR gate 19. The transmission authorizing signal AK applied from the paired data detection portion 2 is also applied to the transfer control portion 15 through the OR gate 19. A transmission authorizing signal is applied to the address operating portion 13 from the address latch 31 included in the program storing portion 30, and a transmission signal is applied to the address latch 31 from the address operating portion 13.

Figure 8:
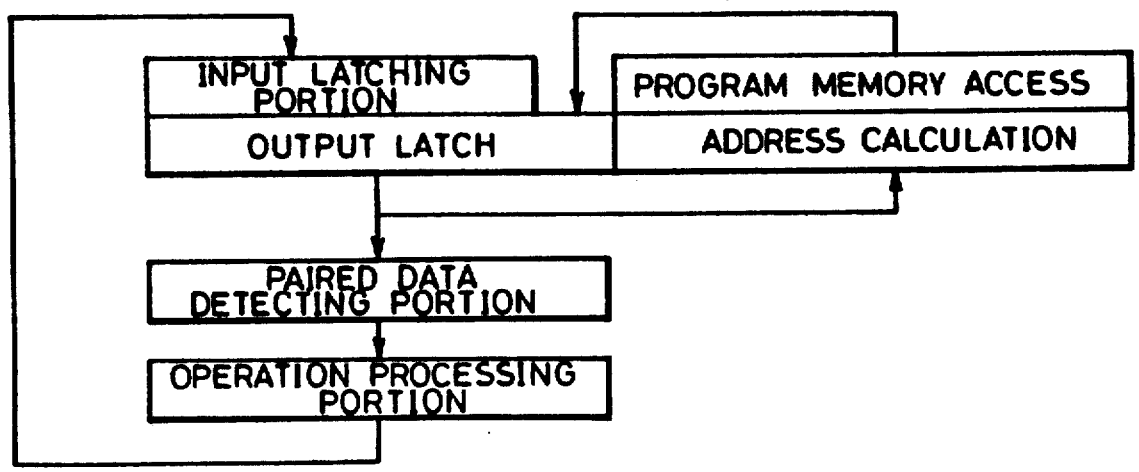
FIG. 8 is a diagram for explaining an access method according to another embodiment of the present invention.

FIG. 8 is a diagram for explaining an access method according to the embodiment illustrated in FIG. 7.

Referring now to FIGS. 7 and 8, a description is made on a specific operation according to another embodiment of the present invention. It is assumed that destination information, instruction information and operand data are applied to an input data latching portion 11, and a transmission signal C is applied to a transfer control portion 12 and a transmission authorizing signal AK is applied thereto through a NOR gate 18. The transfer control portion 12 latches the destination information, the instruction information and the operand data in the input data latching portion 11. On this occasion, it is assumed that destination information, instruction information and operand data immediately before are latched in the output data latching portion 14. The destination information latched in the output data latching portion 14 is applied to the address operating portion 13. On this occasion, a transmission signal is applied to the transfer control portion 15 from the data latch 33 and a transmission authorizing signal AK is applied to the transfer control portion 15 from the address operation portion 13 through the NOR gate 19. Correspondingly, the transfer control portion 15 outputs a pulse signal from a $Q_1$ output, for applying the same to the address operating portion 13.

The address operating portion 13 operates address data in the program memory 32 based on the destination information applied from the output data latching portion 14, for applying the address data to the address latch 31. On this occasion, the transmission signal is applied to the address latch 31 from the address operation portion 13, so that the address latch 31 latches the address data based on the transmission signal. The program memory 32 is accessed based on the address data latched in the address latch 31, and a data flow program is read out from an addressed area, to be latched in the data latch 33. The destination information and the instruction information latched in the data latch 33, together with the operand data outputted from the input data latching portion 11, are latched in the output data latching portion 14. The destination information, the instruction information and the operand data latched in the output data latching portion 14 are applied to the paired data detecting portion 2. After paired data is detected, the operation processing portion 3 performs operation processing.

Meanwhile, in the embodiment illustrated in FIG. 7, when data is written to the program memory 32, the data flow program is latched in the data latch 33 from the input data latching portion 11 through a path represented by a dotted line, and the program memory 32 is addressed by the address operating portion 13, so that the latched data flow program is written therein.

Figure 11:
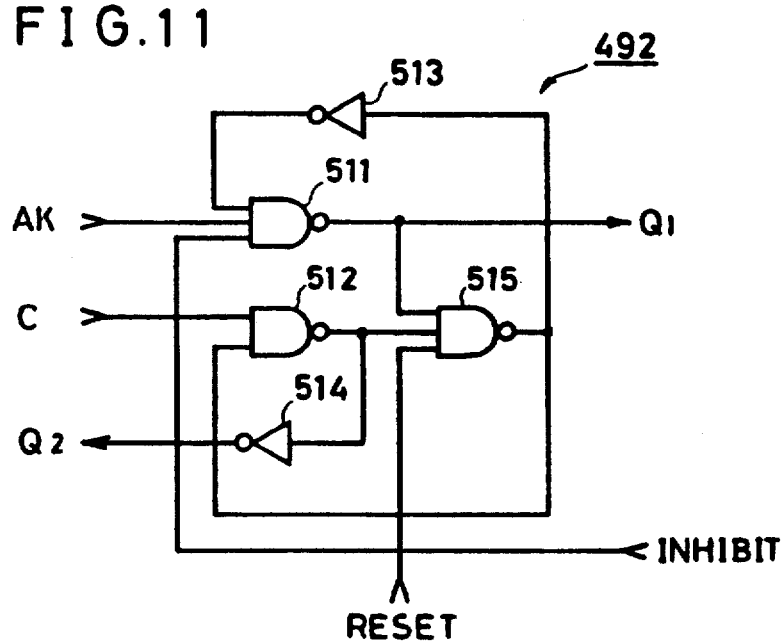
FIG. 11 is a schematic block diagram, illustrating a transfer control portion shown in FIG. 10.
Figure 9:
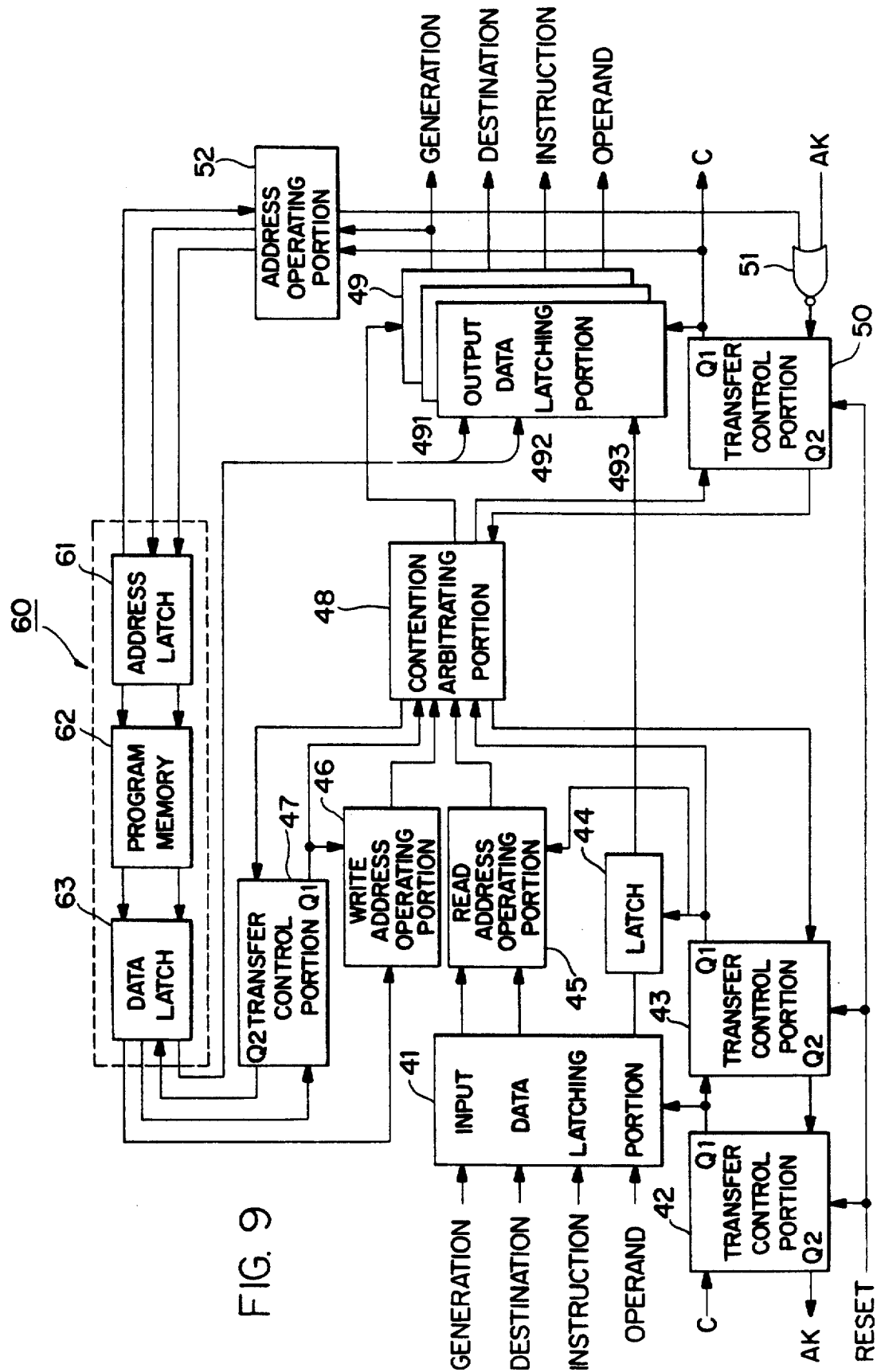
FIG. 9 is a block diagram illustrating a data flow type information processor according to another embodiment of the present invention.
Figure 10:
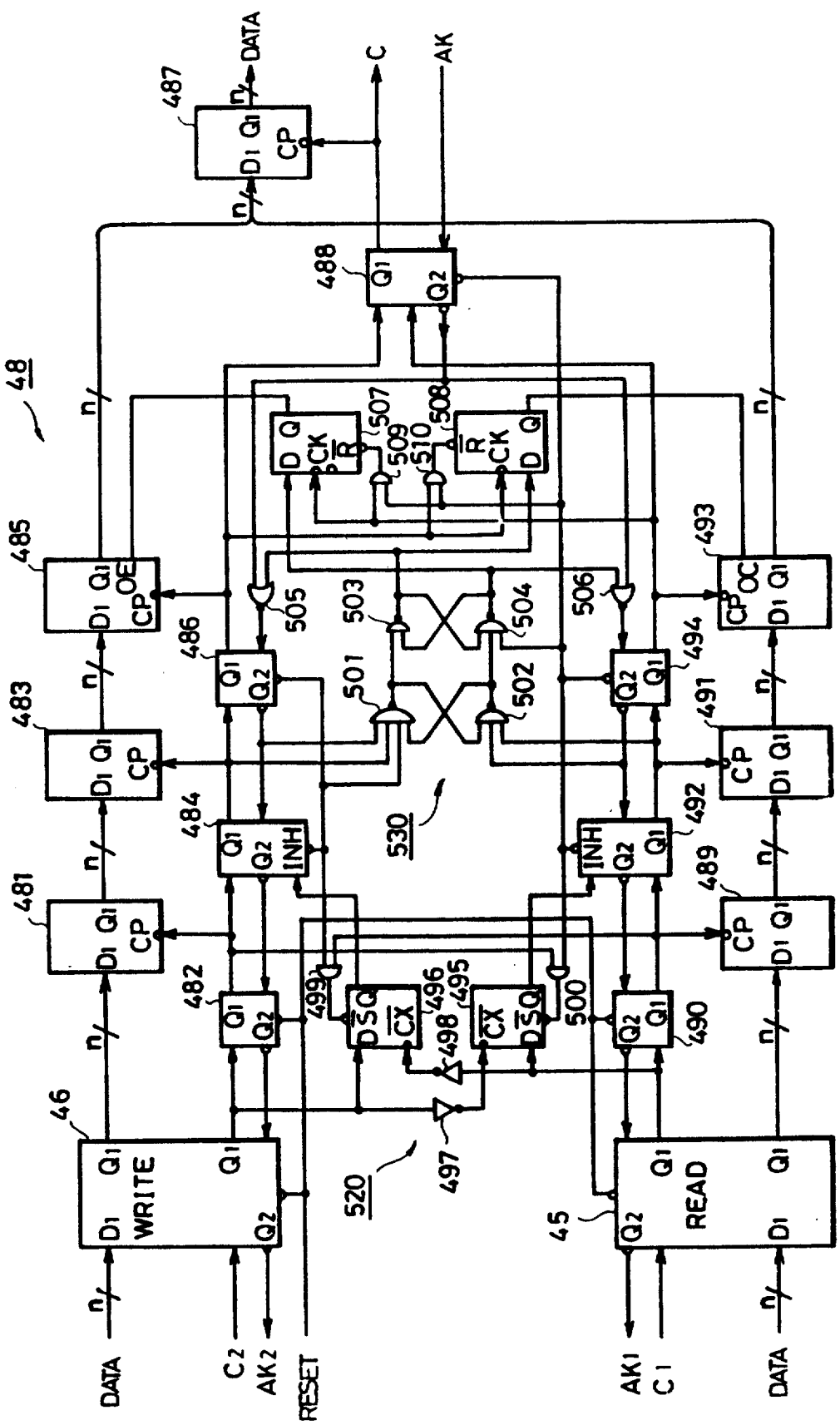
FIG. 10 is a more schematic block diagram illustrating a contention arbitrating portion shown in FIG. 9.

FIG. 9 is a schematic block diagram illustrating a data flow type information processor according to another embodiment of the present invention, and FIG. 10 is a more detailed schematic block diagram of a contention arbitrating portion illustrated in FIG. 9. FIG. 11 is a schematic block diagram of transfer control portions 484 and 492 illustrated in FIG. 10.

Referring now to FIGS. 9 and 10, description is made on a structure according to another embodiment of the present invention. An input data latching portion 41 latches generation number information other than destination information, instruction information and operand data, in the same manner as the above described embodiments illustrated in FIGS. 4 and 7. This generation number information is a number indicating the order of entry of data applied to the information processor. A transmission signal C is applied to a transfer control portion 42, and a transmission authorizing signal is applied thereto from a transfer control portion 43 in the succeeding stage. When the transmission signal and the transmission authorizing signal are applied, the transfer control portion 42 applies a pulse signal to the input data latching portion 41 and the transfer control portion 43 in the succeeding stage. A transmission authorizing signal is applied to the transfer control portion 43 from a contention arbitrating portion 48. When the transmission signal C and the transmission authorizing signal are respectively applied from the transfer control portion 42 in the preceding stage and the contention arbitrating portion 48, the transfer control portion 43 outputs a pulse signal from its $Q_1$ output and applies the same to a latch 44, a read address operating portion 45 and the contention arbitrating portion 48.

The read address operating portion 45 is responsive to the pulse signal applied from the transfer control portion 43 for operating an address in an output data latching portion 49 which is in one-to-one correspondence to the generation number information latched in the input data latch 41 based on the generation number information and the destination information latched in the input data latch 41. In addition, the latch 44 latches the operand data latched in the input data latch 41, for outputting the same to the output data latching portion 49.

A write address operating portion 46 operates an address for writing destination information and instruction information read out from a program memory 62 into the output address latching portion 49, based on the destination information read out from the program memory 62. Write address data operated in the write address operating portion 46 and read address data operated in the read address operating portion 45 are both applied to the contention arbitrating portion 48. A transfer control portion 47 is provided in association with the write address operating portion 46. A transmission signal is applied to this transfer control portion 47 from a data latch 63, and a transmission authorizing signal is applied to the transfer control portion 47 from the contention arbitrating portion 48.

Additionally, the transmission authorizing signal is applied to the data latch 63 from the transfer control portion 47. When the transmission signal is applied from the data latch 63 and the transmission authorizing signal is applied from the contention arbitrating portion 48, the transfer control portion 47 generates a pulse signal from its $Q_1$ output, for applying the same to the write address operating portion 46 and the contention arbitrating portion 48. The write address operating portion 46 operates a write address in response to the application of this transmission signal. The contention arbitrating portion 48 avoids contention of access when the read address data and the write address data are specified the same region in the output data latching portion 49. If there is contention, the contention arbitrating portion 48 preferentially outputs either one of the write address and the read address while making the other wait.

The output data latching portion 49 includes an area 491 for latching a plurality of generation number information, an area 492 for latching destination information corresponding to each generation number, an area 493 for latching instruction information corresponding to each generation number, and an area 493 for latching operand data corresponding to each generation number. The generation number information latched in the input data latching portion 41 is latched in an area, in the area 491 specified by the read address data operated by the read address operating portion 45. The areas 492 and 493 are specified by the write address operated by the write address operating portion 46, which latches new destination information and instruction information read out from the program memory 62. The area 494 is specified by the read address data operated by the read address operating portion 46, which latches the operand data latched in the input data latching portion 41.

A transfer control portion 50 is provided association with the output data latching portion 49. A transmission signal is applied to the transfer control portion 50 from the contention arbitrating portion 48, and a transmission authorizing signal AK is applied thereto from an address operating portion 52 through a NOR gate 51. When the transmission signal is applied from the contention arbitrating portion 48 and the transmission authorizing signal is applied through the NOR gate 51, the transfer control portion 50 outputs a pulse signal from its $Q_1$ output for applying the same to the output data latching portion 49, the address operating portion 52 and the paired data detecting portion 2 while outputting a pulse signal from its $Q_2$ output for applying the same to the contention arbitrating portion 48.

The output data latching portion 49 is responsive to the pulse signal derived from the $Q_1$ output of the transfer control portion 50 for latching the generation number information, the destination information, the instruction information and the operand data based on the address data outputted from the contention arbitrating portion 48. A set of the generation number information and the destination information latched in the output data latching portion 49 is inputted to the address operating portion 52, so that an address in the program memory 62 is operated based on the destination information. The address data and a transmission signal are applied to an address latch 61 in the program storing portion 60, and a transmission authorizing signal is applied to the address operating portion 52 from the address latch 61. The address latch 61 is responsive to the transmission signal applied from the address operation portion 52 for latching the address data, accessing the program memory 62 and reading out a data flow program from the specified address data to latch the same in the data latch 63.

Referring now to FIG. 10, a description is made on a structure of the contention arbitrating portion 48. A data transmission path including data latches 481, 483 and 485 and transfer control portions 482, 484 and 486 are connected to an output side of the write address operating portion 46, and a data transmission path including data latches 489, 491 and 493 and the transfer control portions 490, 492 and 494 are connected to an output side of the read address operating portion 45. The transfer control portions 482, 484 and 486 are responsive to an input of one transmission signal, an input of one transmission authorizing signal, an output of one transmission signal and an output of one transmission authorizing signal for performing the same handshaking transfer control as that of the above described transfer control portions 12 and 15 illustrated in FIG. 6.

Similarly, the transfer control portions 490, 492 and 494 are responsive to an input of one transmission signal, an input of one transmission authorizing signal, an output of one transmission signal and an output of one transmission authorizing signal for performing handshaking control. The data latch 487 on the output side latches address data by transfer control of the transfer control portion 488. Different transmission signals are respectively inputted to the transfer control portion 488 from the transfer control portions 486 and 493. In order to detect contention between read address data outputted from the read address operating portion 45 and write address data outputted from the write address operating portion 46, there is provided a contention detecting portion 520. The contention detecting portion 520 is provided with D-type flip-flops 495 and 496, inverters 497 and 498 and AND gates 499 and 500.

The D-type flip-flop 495 inhibits a transmission signal C2 from being transferred from the transfer control portion 482 to the transfer control portion 484 when the read address data is applied to the data latch 489 before the write address data is applied to the data latch 481. Similarly, the D-type flip-flop inhibits a transmission signal C1 from being transferred from the transfer control portion 490 to the transfer control portion 492 when the write address data is applied to the data latch 481 before the read address data is applied to the data latch 489.

The transfer control portion 492 is structured as illustrated in FIG. 11, to inhibit transfer of the transmission signal C1 in response to an output of the above described D-type flip-flop 495. More specifically, the transfer control portion 492 includes 3 input NAND gates 511 and 515, a two input NAND gate 512 and inverters 513 and 514. A transmission authorizing signal AK1 and a Q output of the D-type flip-flop 495 are applied to the three input NAND gate 511 as an inhibiting signal, a transmission signal C is inputted to the NAND gate 512, a $Q_2$ output is derived from the inverter 514, a $Q_1$ output is derived from the NAND gate 511, and a reset signal is inputted to the NAND gate 515. The transfer control portion 484 is structured in the same manner as the transfer control portion 492.

An arbitration control portion 530 includes NAND gates 501 and 502 constituting a flip-flop in the preceding stage, NAND gates 503 and 504 constituting a flip-flop in the succeeding stage, D-type flip-flops 507 and 508, AND gates 509 and 510, and NOR gates 503 and 506. This arbitration control portion 530 arbitrates the output order depending on the crowded condition of respective address signals in the data transmission path including the data latches 481, 483 and 485 and the data transmission path including the data latches 489, 491 and 493, latching the same in the data latch 487.

A description is now made on an operation of the contention arbitrating portion illustrated in FIG. 10. Consider a case in which the write address data outputted from the write address operating portion 46 is outputted to the data latch 481 a little later than the read address data outputted from the read address operating portion 45. The read address data is applied to the data latch 489 and the transmission signal C1 is applied to the transfer control portion 490 and the inverter 498. Thus, before the transmission signal C1 returns from an "L" level to an "H" level, the write address data is applied to the data latch 481 a little later than the read address data, and the transmission signal C2 is applied to the transfer control portion 482. A D input of the D-type flip-flop 496 is at the "L" level. Thus, when the transmission signal C1 returns from the "L" level to the "H" level, a Q output of the D-type flip-flop 496 attains the "L" level, so that the transmission signal C2 transferred to the transfer control portion 484 is stopped in the transfer control portion 484 without being sent to the transfer control portion 486.

When a $Q_1$ output of the transfer control portion 490 is transmitted to the transfer control portion 492, an output of the AND gate 499 attains the "L" level in response to this $Q_1$ output. Consequently, the Q output of the D-type flip-flop 496 is set, so that the transmission signal C2 which was stopped in the transfer control portion 484 is allowed again and to be transferred, to be transmitted to the transfer control portion 486.

If the read address data is outputted to the data latch 489 a little later than the write address data, the same operation is performed.

Description is now made on an operation of the contention control portion 530. In an initial state, the transfer control portion 488 has been reset, so that its $Q_1$ output is at the "H" level, and its $Q_2$ output is at the "L" level. The reset signal has been also applied to the NAND gate 501, so that an output thereof is at the "H" level. The "H" level signal is applied to the NAND gate 502 constituting the flip-flop in the preceding stage. Other inputs of the NAND gate 502 all attain the "H" level in a state in which the transfer control portions 490, 492 and 494 are respectively reset, and an output of the NAND gate 502 attains the "L" level, so that the flip-flop in the preceding stage including the NAND gates 501 and 503 is in a stable state.

Since a flip-flop in the succeeding stage including the NAND gates 503 and 504 receives an output of the flip-flop in the preceding stage and a reset signal is inputted to the NAND gate 504, an output of the NAND gate 504 attains the "H" level and an output of the NAND gate 503 attains the "L" level, so that the flip-flop in the succeeding stage is also stabilized. The output of the NAND gate 504 is applied to an input of the NOR gate 506, so that an output of the NOR gate 506 attains the "L" level. As a result, the address data is inhibited from being transmitted to the data latch 487.

The output of the NAND gate 503 is applied to an input of the NOR gate 505, so that an output of the NOR gate 503 attains the "H" level, for allowing transmission of the address data to the data latch 487. In this state, if the read address data is applied to the data latch 489 before the write address data is applied to the data latch 481, the transmission signal C2 is inhibited from being transferred by the transfer control portion 484 and the transmission signal C1 is sequentially transmitted through the transfer control portions 490, 492 and 494, so that the output of the NAND gate 502 is changed from the "L" level to the "H" level.

Additionally, the inputs of the NAND gate 501 all attain the "H" level and the output thereof attains the "L" level, so that the flip-flop in the preceding stage is stabilized. In addition, the output of the NAND gate 503 changes from the "L" level to the "H" level, so that this output becomes an input of the NAND gate 504, which attains the "H" level. Consequently, the output of the NAND gate 504 attains the "L" level, so that the flip-flop in the succeeding stage is stabilized. The "L" level signal which is the output of the NAND gate 504 becomes an input of the NOR gate 506, and the transmission authorizing signal outputted from the output $Q_2$ of the transfer control portion 488 becomes active, so that the $Q_1$ output of the transfer control portion 494 attains the "L" level. If and when the transmission authorizing signal AK transmitted to the transfer control portion 494 is at the "H" level, the $Q_1$ output of the transfer control portion 488 attains the "L" level and becomes a clock pulse of the data latch 487, so that the read address data inputted to the data latch 487 through the data latches 489, 491 and 493 is outputted.

In a period during which the transmission signal is outputted to the transfer control portion 488 from the transfer control portion 494, the "H" level signal, which is an output of the NAND gate 503, is held as an output of the flip-flop in the succeeding stage and inputted to the NOR gate 505, so that the output of the NOR gate 505 is held at the "L" level. Accordingly, the transmission signal is inhibited from being outputted from the transfer control portion 486 to the transfer control portion 488. In addition, the output of the D-type flip-flop 507 is brought to the "L" level in response to the output of the transfer control portion 494, so that an output Qi of the data latch 485 is brought to a high impedance state, and does not collide with a Qi output of the data latch 493.

As described in the foregoing, in the embodiment illustrated in FIGS. 9 and 10, even if the input data packet is sequentially applied to the input data latching portion 41 from the operation processing portion 3, the operand data, the instruction information, the destination information and the generation number information are sequentially stored in the output data latching portion 49 in the order of the generation number. Thus, the input data packet is not made to wait on the input side of the program storing portion, so that the waiting time becomes the shorter. As a result, the processing speed can be increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data flow type information processor, comprising:
    program storing means for storing a data flow program having a data packet of destination information and instruction information, said program storing means being provided separate from an information processing portion of the data flow type processor; and
    program providing means for processing an input data packet of input destination information, input instruction information and operand data, said program providing means being provided in said information processing portion of the data flow type information processor and including, input storing means having said input data packet together with a transmission signal applied thereto for storing said input destination information, said input instruction information and said operand data included in said input data packet and autonomously and selectively transferring said input destination information, said input instruction information and said operand data to said program storing means, said input storing means comprising input-side data holding means including an area for storing said input destination information, said input instruction information and said operand data included in said input data packet and input-side transfer control means responsive to the application of said transmission signal and a transmission authorizing signal for holding said input destination information, said input instruction information and said operand data included in said input data packet, address operating means for developing address data which addresses said program storing means in response to said input destination information transferred from said input storing means and reading out said destination information and said instruction information from said program storing means in response to said address data, and output storing means having only the held operand data and said transmission signal input thereto from said input-side transfer control means for storing said destination information and said instruction information read out from said program storing means and autonomously and selectively transferring said destination information and said instruction information to an external device, and generating said transmission authorizing signal, said output storing means comprising output-side data holding means including an area for storing said destination information, said instruction information and said operand data and output-side transfer control means responsive to the application of said transmission signal from said input-side transfer control means and the application of a succeeding transmission authorizing signal from the succeeding processor stage for holding said destination information and said instruction information read out from said program storing means and said operand data outputted from said input-side data holding means and said output-side data holding means.

2. The information processor according to claim 1, wherein said program storing means comprises address temporary storage means for temporarily storing the address data developed by said address operating means, a program memory for storing said data flow program, and data temporary storage means for temporarily storing the destination information and the instruction information in the data flow program read out from said program memory and applying the destination information and the instruction information to said output storing means.

3. A data flow type information processor comprising:

program storing means for storing a data flow program having a data packet of destination information and instruction information, said program storing means being provided separate from an information processing portion of the data flow type information processor; and program providing means for processing an input data packet of input destination information, input instruction information and operand data, said program providing means being provided in said information processing portion of the data flow type information processor and including, input storing means having said input data packet together with a transmission signal applied thereto for storing said input destination information, said input instruction information and said operand data included in said input data packet and autonomously and selectively transferring said input destination information and said input instruction information to said program storing means, said input storing means comprising input-side data holding means including an area for storing said input destination, said input instruction information and said operand data included in said input data packet and transfer control means responsive to the application of said transmission signal and a transmission authorizing signal from said output storing means for holding said input destination information, said input instruction information and said operand data included in said input data packet and outputting only the held operand data and said output storing means to said output storing means, output storing means for storing said destination information and said instruction information read out from said program storing means and autonomously and selectively transferring said destination information and said instruction information to an external device, and address operating means for developing address data which addresses said program storing means in response to said destination information stored in said output storing means, reading out said destination information and said instruction information from said program storing means in response to said address data and applying said destination information and said instruction information to said output storing means.

4. The information processor according to claim 3, wherein said output storing means comprises output-side data holding means comprising an area for storing the destination information, the instruction information and the operand data, and output-side transfer control means responsive to the application of said transmission signal from said input-side transfer control means and the application of a succeeding transmission authorizing signal from the succeeding processor stage for holding in said output-side data holding means the destination information and the instruction information read out from said program storing means and the operand data outputted from said input-side data holding means.

5. The information processor according to claim 3, wherein said program storing means comprises address temporary storage means for temporarily storing the address data developed by said address operating means, a program memory for storing said data flow program, and data temporary storage means for temporarily storing the destination information and the instruction information in the data flow program read out from said program memory and applying the destination information and the instruction information to said output storing means.

6. A data flow type information processor, comprising:

program storing means for storing a data flow program having a data packet of destination information, instruction information and operand data, said program storing means being provided separate from the information processing portion of the data flow type information processor;

program providing means for processing an input data packet of input destination information, input instruction information and input operand data, said program providing means being provided in said information processing portion of the data flow type information processor and including, input storing means for storing every generation number information of said input destination information, said input instruction information and said input operand data included in said input data packet, output storing means for hierarchically storing every generation number information of said data flow program read out from said program storing means by utilizing address data obtained from said destination information stored in said input storing means, first address operating means for reading out the generation number information and said input operand data from said input storing means and developing read address data to be stored in said output storing means in response to said input destination information and the generation number information stored in said input storing means, second address operation means for developing address data for said program storing means in response to said destination information included in said data flow program stored in said output storing means and thereby addressing said program storing means;

third address operating means for developing write address data in response to said input destination information and the generation number information stored in said input storing means in order to write into said output storing means said destination information and said instruction information read out from said program storing means, and contention arbitrating means for arbitrating contention between said read address data developed by said first address operating means and said write address data developed by said third address operating means and applying one of the address data to said output storing means.

7. The information processor according to claim 6, wherein said input storing means comprises input-side data holding means for holding every generation number information of said input destination information, said input instruction information and said operand data included in said input data packet, and output transfer control means responsive to the application of said transmission signal and the application of a transmission authorizing signal from said output storing means for holding the destination information, the instruction information, the operand data and the generation number information included in said input data packet, and outputting only the held operand data and said transmission signal to said output storing means.

8. The information processor according to claim 7, wherein said output storing means comprises output-side data holding means comprising an area for storing the destination information, the instruction information and the operand data corresponding to a plurality of generation number information, and output-side transfer control means responsive to the application of said transmission signal from said input-side transfer control means and the application of a succeeding transmission authorizing signal from the succeeding processor stage for holding in said output-side data holding means the destination information and the instruction information read out from said program storing means and said operand data outputted from said input-side data holding means, respectively, in response to said address data operated by said first address operating means.

9. The information processor according to claim 6, wherein said program storing means comprises address temporary storage means for temporarily storing address data operated by said second address operating means, a program memory for storing said data flow program, and data temporary storage means for temporarily storing the destination information and the instruction information in the data flow program read out from said program memory and applying the destination information and the instruction information to said output storing means.

10. The information processor according to claim 7, wherein said first address operating means comprises first outputting means for outputting a first transmission signal every time said read address data is outputted, and said third address operating means comprises second outputting means for outputting a second transmission signal every time said write address data is outputted, and the information processor further comprises first transfer means responsive to the application of the first transmission signal from said first address operating means for transferring said read address data, second transfer means responsive to the application of the second transmission signal from said second address operating means for transferring said write address data, third transfer means responsive to the application of the first or second transmission signal from said first or second transfer means for transferring to said output storing means the read address data or the write address data transferred from the first or second transfer means, first state storing means set in response to the first transmission signal being applied to said first transfer means and the second transmission signal failing to be applied to said second transfer means, and second state storing means set in response to the second transmission signal being applied to said second transfer means and the first transmission signal failing to be applied to said first transfer means, said first transfer means comprising first gate means for inhibiting said first transmission signal from being transmitted to said third transfer means when said first state storing means is set, and said second transfer means comprising second gate means for inhibiting said second transmission signal from being transmitted to said third transfer means when said second state storing means is set.

11. A method for storing a data flow program having a data packet of destination information and instruction information in a data flow type information processor including an information processing portion and program storing means with the program storing means being separate from the information processing portion, comprising the steps of:

(a) applying an input data packet together with a transmission signal;

(b) storing input destination information, input instruction information and operand data included in said input data packet;

(c) autonomously and selectively transferring said destination information, said input instruction information and said operand data to the program storing means;

(d) storing said input destination information, said input instruction information and said operand data included in said input data packet to an input-side data holding area;

(e) holding said input destination information, said input instruction information and said operand data included in said input data packet of input-side transfer control means in response to the application of said transmission signal and a transmission authorizing signal;

(f) developing address data for addressing the program storing means in response to said input destination transferred at said step (c);

(g) reading out the destination information and the instruction information from the program storing means in response to said address data;

(h) inputting only the held operand data and said input-side transfer control means to output storing means;

(i) storing the destination information and the instruction information read out from said program storing means at said step in said output storing means;

(j) autonomously and selectively transferring the destination information and the instruction information from said step (i) to an external device;

(k) storing said destination information, said instruction information and said operand data to an output-side data holding area of said output storing means; and (l) holding said destination information and said instruction information read out at said step (g) from said program storing means and said operand data outputted from said input-side data holding area and said output-side data holding area in output-side transfer control means in response to the application of said transmission signal from said input-side transfer control means and a succeeding transmission authorizing signal from the succeeding processor stage.

* * * * *